April 27, 1937. C. F. STAUFFER ET AL 2,078,466

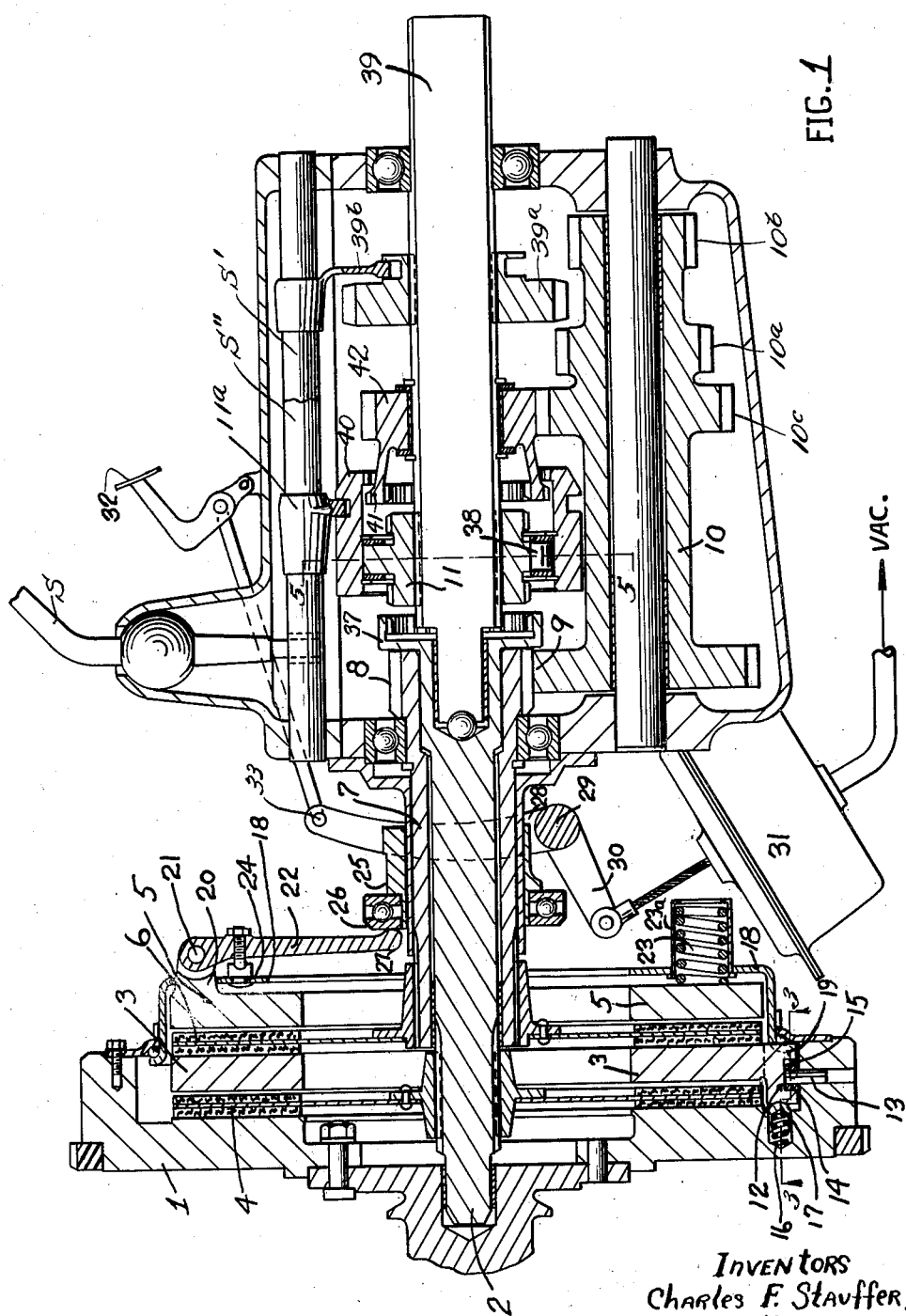

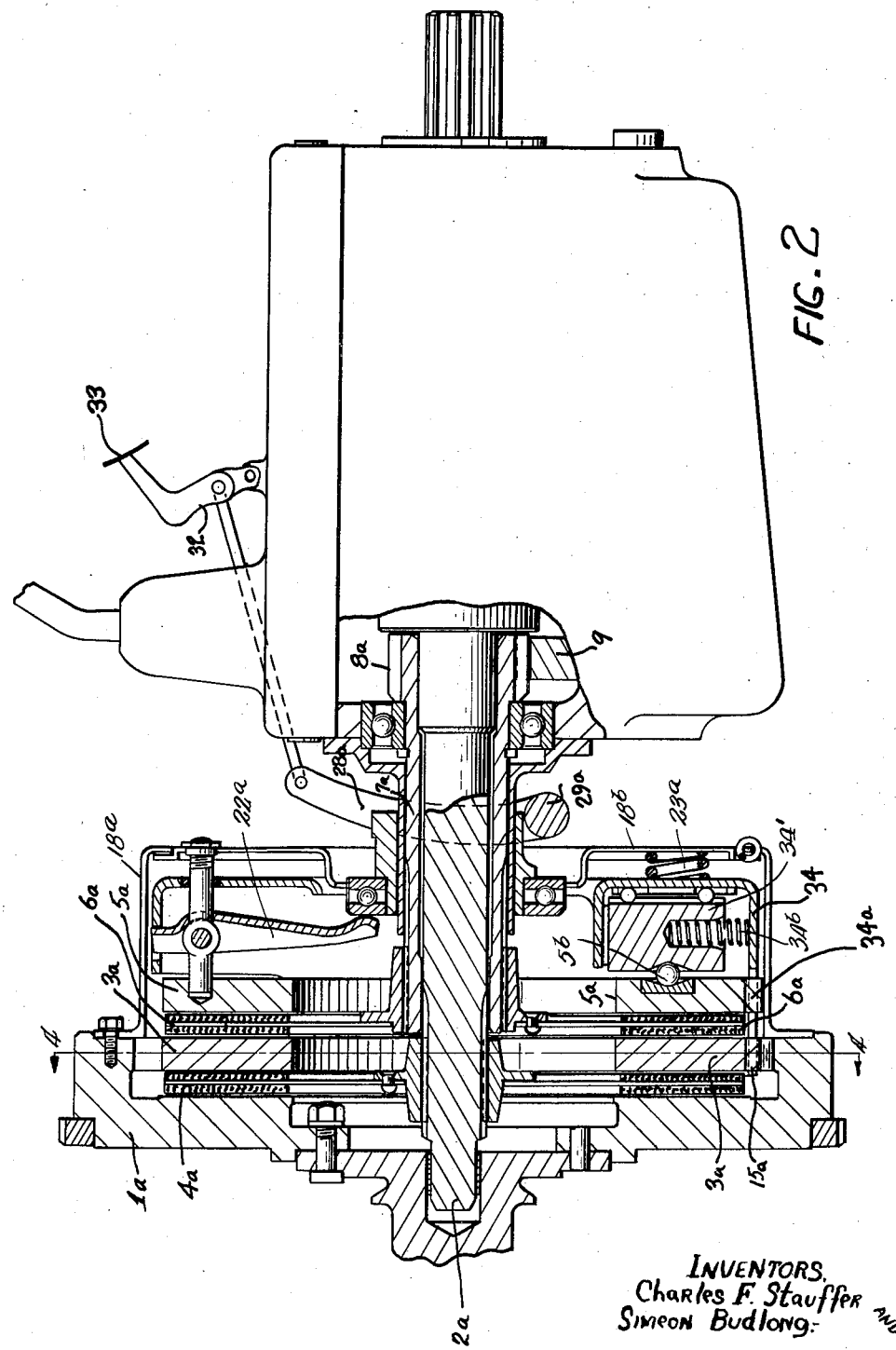

AUTOMATIC SPEED CHANGE CLUTCH AND TRANSMISSION

Filed Feb. 13, 1933 3 Sheets-Sheet 3

INVENTORS.
Charles F. Stauffer and
Simeon Budlong.
BY Wilkinson, Huxley,
Byron & Knight
ATTORNEY.

Patented Apr. 27, 1937

2,078,466

UNITED STATES PATENT OFFICE 2,078,466

AUTOMATIC SPEED CHANGE CLUTCH AND TRANSMISSION

Charles F. Stauffer, Oak Park, and Simeon Budlong, Chicago, Ill.

Application February 13, 1933, Serial No. 656,426

14 Claims. (Cl. 192—48)

This invention relates to multiple clutches for transmitting drive at variable speed ratios, and has for its main object to provide a multiple speed clutch mechanism in which the high speed drive will be held out of action until torque load has been reduced to an order which is not inappropriate to high speed drive.

Other objects relate to the instrumentalities employed for realizing the aforesaid main object, and will appear as the description proceeds.

In realizing the main object of the invention, any desired number of clutches may be employed, varying one from another in the speed of its transmission, and each consisting of a driving member, which receives power from the power source or from the driving member of an antecedent clutch, and a transmitting member through which, when the clutch is closed, the power is delivered to the speed determining mechanism and through it to the work that is to be performed.

In each of the two embodiments herein selected for purposes of illustration, there are two clutches in sequence, each consisting of the aforesaid driving and transmitting members and identified, respectively, as the high speed clutch and the low speed clutch. The driving member of the high speed clutch receives its drive from the flywheel or other source of power through a camming means which holds the high speed clutch open so long as torque resistance exists of an order that is greater than appropriate to the high speed drive, while the low speed clutch has its driving member coupled with the driving member of the high speed clutch but is normally pressed in closing direction and has its closing pressure imparted through its transmitting member to the high speed clutch so as to close the latter as soon as torque resistance is sufficiently reduced.

Other features of the invention have to do with means responsive to a running function of an engine, whereby the low speed clutch is forced to closed position when the engine speed is increased substantially above its normal idling speed. Another element, responsive to a running function of the engine, may be employed if desired to release the low speed clutch closing pressure under certain driving conditions of the engine, for instance, when idling, so that in coming to a temporary stop, with the engine still running, it is merely necessary to release the accelerator and apply the brake, voluntary declutching being unnecessary; and there being certain adjunctive devices such, for instance, as voluntary speed changing means and means for voluntary declutching when the latter is used, as more fully described in our copending application Serial No. 619,236.

In the accompanying drawings showing the two exemplifications referred to—

Figure 1 is a vertical axial section of a transmission clutch mechanism constructed in accordance with the present invention and associated with speed changing transmission mechanism of the general type described in our aforesaid copending application.

Figure 2 is a similar view with the speed changing transmission mechanism partly in elevation, showing certain modifications in the clutch, such, for instance, as the addition of a centrifugal clutch closing adjunct shown in addition to, although applicable with or without, the closing springs of Figure 1.

Figure 4:
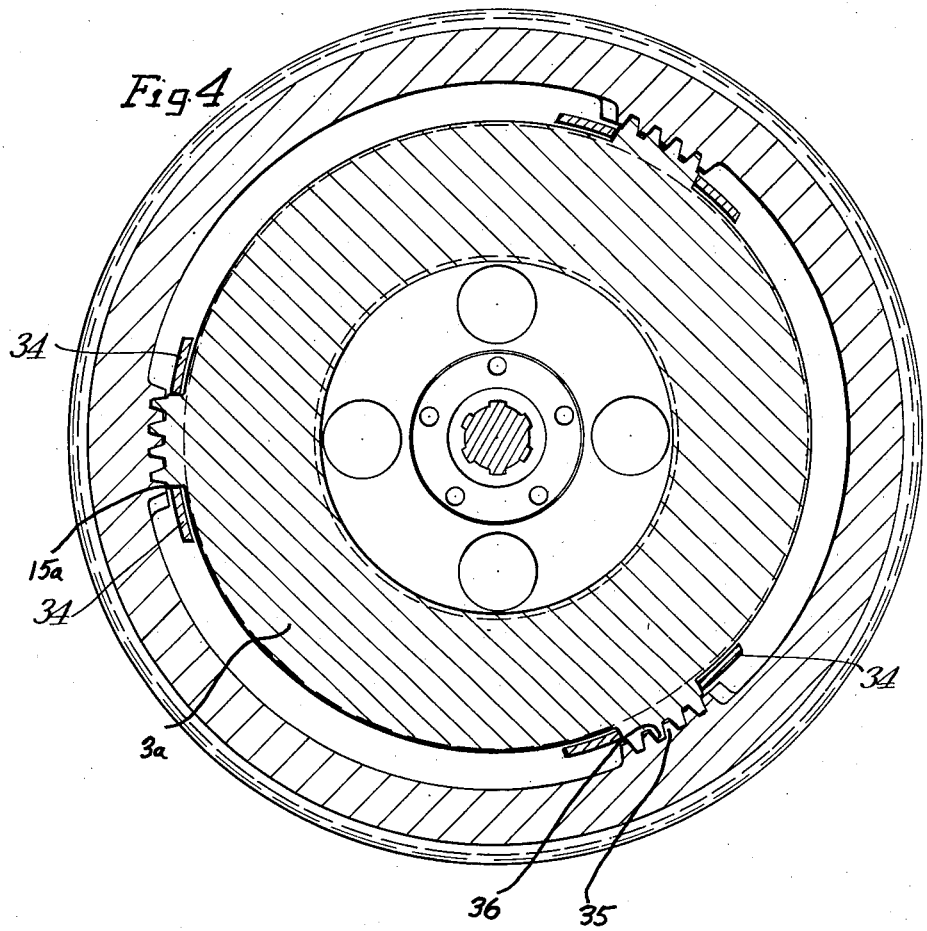
Figure 4 is a section on the line 4—4 of Figure 2 and showing a modified construction of camming means between the flywheel and the driving member of the high speed clutch.

Referring to Figure 1, I represents the flywheel revolubly mounted upon shaft 2. 3 represents the driving member of a high speed clutch, and 4 the transmitting member thereof, which latter is keyed to the shaft 2 in order to impart a one-to-one drive when the said high speed clutch is in function. 5 represents the driving member of the low speed clutch and 6 the transmitting member thereof, which latter is keyed to a sleeve 7 which is rotatably mounted upon the shaft 2, but which carries the gear 8 meshing with gearwheel 9 upon countershaft 10 which carries various gears adapting it to serve as both an automatic transmission element and a selective gear change transmission element, as well as to associate these two characters of transmission, as broadly set forth in our aforesaid application, but with some changes in detail herein having to do mainly with the overrunning element 11 through means of which the automatic speed change is incorporated, and interference with said automatic speed change is avoided when manual speed change is resorted to, as will be hereinafter described.

The countershaft 10, in associating the automatic and manually selective characteristics of the present transmission, is adapted for connection with a parallel power-output shaft 39 through gearing which in many respects is similar in form to that of the ordinary manually selective transmission gearing. Thus, the countershaft 10 is provided with longitudinally spaced integral gears 10a and 10b, the gear 10a being adapted for direct engagement by a shiftable gear 39a splined on the parallel shaft 39 so as to provide a conventional low speed forward drive for the shaft 39. When the gear 39 is shifted in the opposite direction, it engages a conventional back gear (not shown) driven from the countershaft gear 10b so as to form a reverse drive for the shaft 39. An integral gear 10c on the countershaft 10 is in constant mesh with a gear 42, which is rotatably, or loosely, mounted on the shaft 39 so as to be rotated constantly by the countershaft, and provide an intermediate drive which may be connected to the shaft 39, as will be hereinafter described, either in a non-overrunning forward drive of conventional intermediate drive characteristics, or as an overrunning forward drive constituting the lower speed of the automatic transmission.

Manual selection of the various transmission ratios of the manually selective drive, as well as the conditioning of the automatic drive, are attained through a conventional H-type gear shift lever S, the lower end of which may be selectively engaged with either of two slides S' and S". The slide S' carries a yoke 39b which shifts the gear 39a in either direction from its neutral position of Figure 1 to its low or reverse driving positions. A similar yoke 11a on the slide S" engages the outer member 40 of the overrunning unit 11 for shifting the unit as a whole from its neutral position of Figure 1 to a forward position (left-hand in Figure 1) wherein the automatic drive is conditioned for operation, or to a rear position wherein a non-overrunning intermediate drive is provided. The details of these last two driving connections are described hereinafter.

Figure 3:
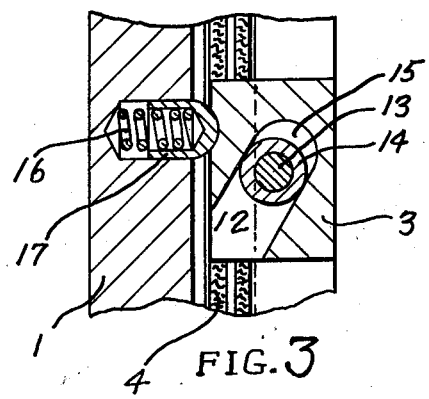
Figure 3 is a section on the line 3—3 of Figure 1 showing the camming means used to establish drive between the flywheel and the driving member of the high speed clutch; also the spring for initiating opening of the high speed clutch and neutralizing the cam.

Driving member 3 of the high speed clutch receives its drive directly from flywheel 1 through the medium of camming device 12 which, according to Figure 1, consists of a dowel pin 13 on the flywheel carrying antifriction roller 14 which enters cam groove 15 in said high speed clutch driving member 3, as shown more clearly in Figure 3. The effect of this camming device is that when the flywheel is rotating in its normal direction—which is counterclockwise when viewed from the driver's seat—the pin 13 tends to travel toward the observer in Figure 3 and thereby press the high speed clutch driving member 3 toward the right, which is its clutch releasing direction or direction in which it moves out of engagement with the transmitting member 4 of the said clutch. Also acting upon the driving member 3 of the high speed clutch in the direction to separate it from its transmitting member 4, is a minor spring device 16 which tends to keep the high speed clutch initially disengaged; and by having the shell 17 of said minor spring 16 indented into the member 3, it will neutralize the cam 14, 15 as well.

According to the design shown in Figure 1, driving member 3 of the high speed clutch drives the driving member 5 of the low speed clutch through the medium of the shell 18, with which member 3 is splined as shown at 19; said shell 18 being in turn interengaged with the low speed driving member 5 through the medium of its lug 20 projecting through the said shell, where it serves as the pivotal mounting 21 for a clutch controlling lever 22, to be later referred to. Low speed clutch 5, 6 is normally pressed in the direction to close the clutch by means of a suitable number of springs, typified by spring 23 in Figure 1, which is mounted in a housing 23a, and presses directly against the driving member 5 of the low speed clutch. The springs 23 are, of course, of a much greater strength than the springs 16. These springs 23 press the member 5 against low speed transmitting member 6 and thus cause a reaction in the member 5 from torque resistance imposed by the work which is to be performed. This torque resistance is transmitted through shell 18 to the driving member 3 of the high speed clutch and causes driving pintle 13 of the flywheel 1 to act against the inclined wall of the camming slot 15 and force the said high speed driving member to the right, as viewed in Figures 1 and 3, and thereby hold open the high speed clutch while the inertia of the load or other work is being overcome by the low speed clutch. It will be evident that, during transmission of drive thru the low speed clutch, the drive from flywheel 1 is transmitted solely through the cam rollers 14 to the cam slots 15 to the member 3, and that it is because of this transmission of load through this path that member 3 is held in its right hand or open position. Upon sufficient decrease of the load transmitted through rollers 14 and cams 15, the camming force which has sustained the member 3 in its right hand or open position is, of course, removed, and the springs 23 are thereby made the dominating axial force on member 3 (as well as members 5 and 6) so that the member 3 is shifted to the left to its closed position. The opening movement of the driving member of the high speed clutch also causes it to present itself as a sustaining abutment for the transmitting member 6 of the low speed clutch, said high speed driving member being afforded a range of movement before encountering abutment surfaces formed by the inner or forward end of the shell 18 intermediate the splines 19, so that in its rearward position the member 3 is able to serve this additional abutment or backing function.

The low speed driving member 5 may be withdrawn to its open position against the closing pressure of springs 23 by means of an appropriate number of levers 22, fulcrumed at 21 as aforesaid, and bearing against the shell 18 at 24, said levers being in turn controlled by a release collar 25 bearing through its anti-friction ring 26 against the free ends 27 of said levers; and which said release collar is in turn controlled by bell crank forked lever 28 fulcrumed at 29 and moved by either or both of two instrumentalities, such, for instance, as vacuum cylinder 31 attached to the lower free end 30 of the lever and which may be connected with the engine manifold, or pedal 32 connected with the upper free end 33 of said lever and located within reach of the driver, as circumstances may dictate.

When it is desired to engage the clutches from their disengaged position of Figure 1, the release bearing 26 is shifted rearwardly, or to the right in Figure 1, thereby removing the restraint on the low speed driving member 5, and allowing the same to be shifted forwardly toward its engaged position by the expansive clutch springs 23. As the driving member 5 firmly engages the driven member 6 of the low speed clutch, it forces the member 6 against the driving member 3 of the high speed clutch thereby transmitting the closing pressure of springs 23 to the driving member 3 of the high speed clutch and tends to press the latter to closed position. But so long as torque resistance, already referred to as reacting upon the cam connection 13, 15, is of an order sufficient to resist such closing pressure on the clutch 3, 4, drive will be through the low speed clutch alone; but a sufficient drop in the said torque resistance to make high speed drive appropriate will permit the driving member 3 to yield to the lateral pressure of springs 23 transmitted through clutch 5, 6, thereby displacing the pin 13 and causing the high speed clutch to close and assume transmission of the power to the driven element. This shifting of the drive does not release the low speed clutch but leaves the latter functioning as before. Simultaneous operation of both is permitted by reason of the overrunning connection 11. The displacement of pin 13 just referred to as a result of lateral clutching pressure received by member 3 from the clutch 5, 6, is that which results from the inclination of the confine of the camming groove shown in Figure 3. That is to say, by lateral movement of member 3 sufficient to close the clutch 3, 4, displacement of pin 13 will be in a direction away from the observer in Figure 3.

Figure 4A:
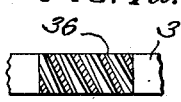
Figure 4a is a detail view of a portion of Figure 4 showing the camming angle of the teeth through which the flywheel drives the said high speed clutch driving member.

In the form of clutch shown in Figures 2, 4, and 4a, there are parts corresponding to most of the elements shown in the form of Figures 1 and 3, which parts are similarly numbered but with the exponent "a"; for instance, flywheel 1a, main shaft 2a, high speed driving member 3a, high speed transmission member 4a, low speed driving member 5a, low speed sleeve 7a having teeth 8a meshing with the teeth of countershaft 9 of the speed change transmission, which may be the same in both forms.

Figure 5:
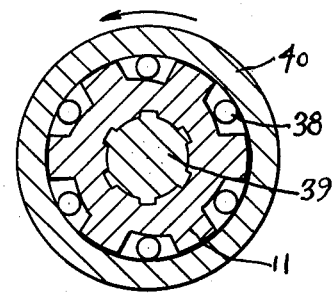
Figure 5 is a section through the overrunning element of the speed change mechanism and in a plane indicated by the line 5—5 of Figure 1.

In the form shown in Figures 2, 4 and 4a, the driving member 3a of the high speed clutch is splined, not to the shell as in Figure 1, but to a counterweight housing 34 as shown at 15a, to which housing high speed driving member 3a is in effect splined as shown at 15a, while the low speed driving member 5a is also splined to the housing 34 as shown at 34a; and the camming connection through which flywheel 1a drives high speed member 3a consists of groups of symmetrically disposed teeth 35 on the flywheel intermeshing with teeth 36 on the member 3a, which teeth are inclined at an angle approximately as indicated in Figure 4a, so that when the flywheel drives the member 3a it displaces said member in the direction which opens the clutch 3a, 4a, and holds said clutch open so long as torque resistance imparted to member 3a from clutch 5a, 6a, is of an order that renders inappropriate the one-to-one drive. But as soon as this torque resistance drops sufficiently to permit the high speed driving member to respond to lateral pressure of the low speed clutch, said high speed clutch will be closed and caused to transmit drive directly from the flywheel 1a to the shaft 2a—an operation which will be permitted by the overrunning clutch 11 in its forward position—which will be present in the transmission of Figure 2 since the latter is identical with that shown in Figure 1. In details this overrunning connection may follow any suitable known construction. One form is suggested in Figure 5.

Within the counterweight housing 34 of Figure 2 a plurality of counterweights 34' (only one shown) are supported and guided for radial movement against the inward radial pressure of springs 34b. The weights 34' are, of course, caused to shift outwardly by centrifugal force as the engine speed increases, and in such movement closing pressure is applied directly to the low speed clutch plate 5a by virtue of an anti-friction cam device 5b interposed between each weight and the clutch plate. A clutch shell 18a, carried by the flywheel 1a and surrounding the housing 34, has an end wall 18b spaced from the housing 34, and between the housing 34 and the end wall 18b a plurality of clutch springs 23a (only one shown) are interposed so as to press the housing, its weights 34' and the clutch parts in a clutch closing direction. Such movement is limited by clutch levers 22a which act between the shell 18a and the housing 34. The levers 22a are associated with the release bearing as in the embodiment of Figure 1, and it will be noted that the housing 34 may be withdrawn at any time by actuation of this release mechanism. In such withdrawal, the springs 23a are compressed and the clutch closing action of the weights 34' nullified so that the high speed clutch opens and restores the torque control means to its governing relation.

By reason of the cam teeth 35, 36, the member 3a is driven from the flywheel 1a, while through the splined connections 15a and 34a the member 5a is driven.

In Figure 1 it is seen that if the overrunning clutch 11 is in the forward position, i. e. engaging the clutch member 37, said clutch member will drive the overrunning clutch 11 directly and therefore will be in direct driving or high relation with the shaft 39 which is splined to the overrunning clutch 11. Meanwhile, the overrunning clutch 11 will overrun the overrunning clutch shell 40, this being permitted by overrunning rollers 38. The shell 40 will at this time engage the outer teeth on the clutch element 41, the overrunning shell 40 and clutch 11 having been shifted forwardly as a unit. The clutch element 41 will be driven by the gear 42 and the countershaft 10 through the low speed clutch, as previously described. Occasionally it is desirable to have the transmission in a non-overrunning low speed, i. e. intermediate gear, as, for example, if it is desired to use the engine as a brake down an unusually steep hill. With the automatic features in operation as described, this would be impossible, since the high speed clutch would become engaged as soon as the driving torque is eliminated when the car starts down hill, and, in any event, the overrunning rollers 38 would permit the clutch 11 and shaft 39 to overrun with respect to the low gear 42, so that the wheels would receive no braking effect from this source. To permit this low speed (intermediate gear) braking effect, provision is made for sliding the clutch 11 to the rear in direct engagement with the inner teeth on clutch element 41. The overrunning clutch is thus cut out of operation, the driving or braking force being transmitted directly from countershaft 10 to gear 42, to the clutch element 41 associated therewith, to the clutch 11, and to the shaft 39. It is thus seen that clutch 11, when in its forward position, makes effective the overrunning and automatic low speed (intermediate gear), whereas in its rear position it makes effective the non-overrunning and non-automatic low speed (intermediate gear).

A very desirable feature of that embodiment of the invention which includes the vacuum actuator 31 is that when the vehicle is brought to a stop with the engine running, as occurs in responding to traffic signals and other conditions and the fuel control valve is closed by release of the accelerator, vacuum rises in the element 31 sufficiently to cause lever 28 to be rocked in the direction to displace the clutch levers 22 and withdraw pressure from clutch 5, 6, and consequently from the clutch 3, 4, so that the transmission automatically idles without the necessity of using the foot pedal. When the accelerator is again pressed, the low speed clutch is first engaged, starting the car in the low speed (intermediate gear), the high speed not becoming effective until the driving torque is appropriately reduced. It is thus seen that when the vacuum actuator 31 is combined with the other features of this invention it becomes possible to drive the car under the control of the accelerator alone, after having originally shifted the gear shift lever to high speed position, where it may be left in spite of all ordinary stops due to traffic. Combination of the vacuum device and the other automatic features makes the shifting into low, the shifting into high and the complete disengagement upon stopping, entirely automatic. While it is not new to use a suction element, as shown at 31, for controlling a single clutch in this way, such suction element performs a new and important function when associated with a multiple of automatically interchanged clutches.

We have shown, in the right-hand portion of Figure 1, one form of transmission embodying some of the novelty of our aforesaid previous application, namely, the novelty of providing in a single transmission, a plurality of automatically interchanged drives together with voluntarily interchanged speed ratio transmissions, whereby the drive may be reversed, enlarged in its ratio beyond the enlargement automatically bestowed, and a driven vehicle coupled to its engine in a manner to continue engine control in descending grades, all without impairment or permanent retirement of the automatic drive; and in which novel technique of operation the high speed clutch will always be available to serve as a part of a manually selected one-to-one drive; the low speed clutch will always be available as a part of the manually selected drive at greater ratio than one-to-one and, in fact, with a ratio which, being the product of the low speed clutch and low speed manual selection, will be especially advantageous as an emergency high power drive.

What is claimed is:

1. A multiple speed clutch mechanism comprising a driving member, a high speed clutch having driven connection with said driving member, a low speed clutch driven by said high speed clutch, means normally imparting closing movement to the low speed clutch, the driven connection between the driving member and the high speed clutch including a camming means which delivers drive to one member of the high speed clutch and normally tends to cam it in the direction to open said clutch, the low speed clutch standing in driven relation to said cammed member and thereby transmitting torque resistance thereto sufficient to cause the camming action, and said cammed member being also under closing pressure transmitted from the low speed clutch whereby it is caused to close and cause drive to be transmitted through the high speed clutch when torque resistance falls sufficiently to permit said closing pressure to overcome said camming action.

2. In a multiple speed clutch mechanism, a power source, high and low speed clutches each comprising a driving member and a transmission member, a camming connection between the driving member of the high speed clutch and the power source adapted to maintain said high speed clutch open when its said driving member encounters excessive torque resistance, means whereby the driving member of the high speed clutch imparts drive to the driving member of the low speed clutch independently of the opening and closing of said high speed clutch and whereby torque resistance encountered by the low speed clutch is transmitted to the said driving member of the high speed clutch, and means at all times imparting closing movement to the low speed clutch; said low speed clutch being adapted to transmit closing pressure to the high speed clutch.

3. In a multiple speed clutch mechanism, a power source, high and low speed clutches each comprising a driving member and a transmission member, a camming connection between the driving member of the high speed clutch and the power source tending to open said high speed clutch when its said driving member encounters excessive torque resistance, means whereby the driving member of the high speed clutch imparts drive to the driving member of the low speed clutch independently of the opening and closing of said high speed clutch and whereby torque resistance encountered by the low speed clutch is transmitted to the said driving member of the high speed clutch, and clutch control means responsive to a running function of an engine and including a part adapted to impart closing pressure to the low speed clutch and through it to the high speed clutch.

4. In a multiple speed clutch mechanism, a power source, high and low speed clutches each comprising a driving member and a transmission member, a camming connection between the driving member of the high speed clutch and the power source tending to open said high speed clutch when its said driving member encounters excessive torque resistance, means whereby a driving member of the high speed clutch imparts drive to the driving member of the low speed clutch independently of the opening and closing of said high speed clutch and whereby torque resistance encountered by the low speed clutch is transmitted to the said driving member of the high speed clutch, means at all times imparting closing movement to the low speed clutch, said low speed clutch being adapted to transmit closing pressure to the high speed clutch, and clutch control means responsive to a running function of an engine, an element of which means also imparts pressure to said clutches in the closing direction.

5. In a multiple speed clutch mechanism, a power source, high and low speed clutches each comprising a driving member and a transmitting member, a camming connection through which the driving member of the high speed clutch is connected with the power source and whereby said high speed clutch is held in open position so long as it encounters a sufficient torque resistance, connecting means whereby torque resistance is transmitted from the low speed clutch to the driving member of the high speed clutch, and minor pressure means acting upon the driving member of said high speed clutch and initially holding said high speed clutch open.

6. In a multiple speed clutch mechanism, a power source, high and low speed clutches each comprising a driving member and a transmitting member, a camming connection through which the driving member of the high speed clutch is connected with the power source and whereby said high speed clutch is held in open position so long as it encounters a sufficient torque resistance, connecting means whereby torque resistance is transmitted from the low speed clutch to the driving member of the high speed clutch, and minor pressure means acting upon the driving member of said high speed clutch and initially holding said high speed clutch open; said minor pressure means being constructed to also hold the camming connection in neutral position.

7. In a power transmitting mechanism, the combination of high and low speed clutch devices, clutch control means operable in response to a running function of a power plant and including means to apply closing pressure to said clutches, and torque controlled means operably associated with said low speed clutch to receive torque resistance therefrom and operatively associated with said high speed clutch whereby it is operable while a predetermined amount of torque resistance exists to oppose and prevent closure of the high speed clutch and is rendered ineffective while the high speed clutch is closed.

8. In a device of the character described, the combination of high and low speed clutches, centrifugal means operable in response to engine speed and including a part to apply closing force to said clutches, and torque controlled means operably associated with said low speed clutch to receive resistance torque therefrom and operatively associated with said high speed clutch whereby it is operable while a predetermined amount of resistance torque exists to oppose and prevent closure of the high speed clutch, said torque controlled means being restrained against opening of the high speed clutch by the interaction of the high speed clutch elements when said high speed clutch is closed.

9. In a power transmitting mechanism, the combination of high and low speed clutch devices, clutch control means operable in response to a running function of a power plant and including means to apply closing pressure to said clutches, torque controlled means operably associated with said low speed clutch to receive resistance torque therefrom and operatively associated with said high speed clutch whereby it is operable while a predetermined amount of resistance torque exists to oppose and prevent closure of the high speed clutch and is rendered ineffective while the high speed clutch is closed, and manipulative means operatively connected to said clutch control means in dominating relationship to the means for applying closing pressure to said clutches and actuatable at the will of the operator at any motor speed to open said high speed clutch.

10. Power transmitting mechanism combining high and low speed clutches, clutch control means operable in response to a running function of an engine and including means to apply closing pressure to said clutches, said clutch control means being operable normally to close said clutches when the engine is stopped, and torque controlled means operably associated with said low speed clutch to receive resistance torque therefrom and operatively associated with said high speed clutch whereby it is operable while a predetermined amount of resistance torque exists to oppose and prevent closure of the high speed clutch.

11. Power transmitting mechanism combining high and low speed clutches, clutch control means operable in response to a running function of an engine and including means to apply closing pressure to said clutches, said clutch control means being operable normally to close said clutches when the engine is stopped, and torque controlled means operably associated with said low speed clutch to receive resistance torque therefrom and operatively associated with said high speed clutch whereby it is operable while a predetermined amount of resistance torque exists to oppose and prevent closure of the high speed clutch and means operatively connected to said clutches and voluntarily actuable by the operator at any time to open said clutches.

12. In a transmission clutch mechanism, the combination of a power source, driving and driven clutch members adapted for relative engaging movement, torque responsive means forming a power transmitting connection between said power source and said driving clutch member and operable while a predetermined amount of torque exists in said connection to oppose and prevent relative engaging movement of said clutch members, said torque responsive means being rendered ineffective to disengage said clutch members by inter-action of said clutch members after and during engagement of said members, and clutch control means responsive to a running function of an engine and including a part for forcing said clutch members together.

13. In a transmission clutch mechanism, the combination of a power source, driving and driven clutch members, adapted for relative engaging movement, and torque responsive means forming the sole power transmission means between said power source and said driving clutch member and operable while a predetermined amount of torque exists in said power transmission means to oppose and prevent engaging movement of said clutch members, said torque responsive means being rendered ineffective to disengage said clutch members after and during engagement of the clutch members.

14. In a power transmission clutch mechanism, the combination of alined rotatable driving and driven members, having co-axial driving and driven clutch elements therebetween, said driven clutch element being connected to said driven member to impart rotation thereto, and means forming a power transmitting connection between said driving member and said driving clutch member and providing for limited relative axial and rotative movement of said driving clutch element and said driving member to engage and disengage the clutch elements, said means being arranged to provide a positive inter-related action between such relative axial and rotative movement and being further arranged in forward rotation of said driving member relative to said driving clutch element to exert a force on said driving clutch element tending to disengage said clutch elements.

CHARLES F. STAUFFER.
SIMEON BUDLONG.